US010384976B2

(12) United States Patent
Nieberle et al.

(10) Patent No.: US 10,384,976 B2
(45) Date of Patent: Aug. 20, 2019

(54) BINDER COMPOSITION

(71) Applicant: BASF SE, Ludwigshafen (DE)

(72) Inventors: Joerg Nieberle, Shanghai (CN);
Sebastian Emmerling, Rheinzabern (DE); Thomas Goetz, Liemersheim (DE); Bogdan Moraru, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 188 days.

(21) Appl. No.: 15/113,324

(22) PCT Filed: Jan. 12, 2015

(86) PCT No.: PCT/EP2015/050387
§ 371 (c)(1),
(2) Date: Jul. 21, 2016

(87) PCT Pub. No.: WO2015/110301
PCT Pub. Date: Jul. 30, 2015

(65) Prior Publication Data
US 2017/0008801 A1 Jan. 12, 2017

(30) Foreign Application Priority Data

Jan. 22, 2014 (EP) .................................... 14152143

(51) Int. Cl.
| | | |
|---|---|---|
| *C04B 111/00* | (2006.01) | |
| *C08F 220/20* | (2006.01) | |
| *C04B 24/26* | (2006.01) | |
| *C08F 220/18* | (2006.01) | |
| *C09D 133/08* | (2006.01) | |
| *C08L 33/08* | (2006.01) | |
| *C04B 28/06* | (2006.01) | |
| *C09D 5/02* | (2006.01) | |
| *B05D 3/00* | (2006.01) | |
| *C09D 7/65* | (2018.01) | |
| *C04B 111/27* | (2006.01) | |
| *C04B 111/60* | (2006.01) | |
| *C04B 111/70* | (2006.01) | |

(52) U.S. Cl.
CPC .......... *C04B 24/2688* (2013.01); *B05D 3/007* (2013.01); *C04B 28/06* (2013.01); *C08F 220/18* (2013.01); *C08L 33/08* (2013.01); *C09D 5/02* (2013.01); *C09D 7/65* (2018.01); *C09D 133/08* (2013.01); *C04B 2111/0062* (2013.01); *C04B 2111/00482* (2013.01); *C04B 2111/27* (2013.01); *C04B 2111/60* (2013.01); *C04B 2111/70* (2013.01); *C08L 2201/54* (2013.01)

(58) Field of Classification Search
None
See application file for complete search history.

(56) References Cited

U.S. PATENT DOCUMENTS

| | | | |
|---|---|---|---|
| 3,043,790 A | 7/1962 | Sanders | |
| 3,196,122 A | 7/1965 | Evans | |
| 3,232,899 A | 2/1966 | Guziak | |
| 3,239,479 A * | 3/1966 | Roenicke | C04B 24/2682 52/309.17 |
| 4,225,496 A | 9/1980 | Columbus et al. | |
| 4,269,749 A | 5/1981 | Marriott et al. | |
| 4,340,510 A | 7/1982 | Howanietz et al. | |
| 5,512,629 A | 4/1996 | Beckerle et al. | |
| 5,576,404 A | 11/1996 | Beckerle et al. | |
| 5,696,185 A | 12/1997 | Beckerle et al. | |
| 6,653,372 B1 | 11/2003 | Pakusch et al. | |
| 8,883,907 B2 | 11/2014 | Moraru et al. | |
| 2003/0170306 A1* | 9/2003 | Raether | C08F 293/00 424/484 |
| 2006/0154096 A1 | 7/2006 | Joubert et al. | |
| 2008/0300343 A1* | 12/2008 | Becker | C04B 24/2647 524/5 |
| 2012/0112122 A1* | 5/2012 | Jung | C08F 2/44 252/79 |
| 2013/0203926 A1* | 8/2013 | Moraru | C04B 28/02 524/456 |

FOREIGN PATENT DOCUMENTS

| | | |
|---|---|---|
| DE | 1669903 | 1/1954 |
| DE | 28 37 898 A1 | 3/1979 |
| DE | 3 220 384 A1 | 12/1983 |
| DE | 40 03 422 A1 | 8/1991 |
| DE | 42 06 429 A1 | 9/1993 |
| DE | 43 17 035 A1 | 11/1994 |
| DE | 43 17 036 A1 | 11/1994 |
| DE | 43 20 220 A1 | 12/1994 |
| DE | 196 24 299 A1 | 1/1997 |
| DE | 196 21 027 A1 | 11/1997 |

(Continued)

OTHER PUBLICATIONS

International Search Report dated Mar. 20, 2015 in PCT/EP2015/050387 (with English translation).

(Continued)

*Primary Examiner* — Francisco W Tschen
(74) *Attorney, Agent, or Firm* — Oblon, McClelland, Maier & Neustadt, L.L.P.

(57) ABSTRACT

Binder compositions comprising as essential components at least one dispersion polymer P having a glass transition temperature ≤20° C. and comprising ethyl acrylate in copolymerized form and also at least one mineral binder M exhibiting low VOC emission after curing.

18 Claims, No Drawings

(56) References Cited

FOREIGN PATENT DOCUMENTS

| | | |
|---|---|---|
| DE | 197 41 184 A1 | 3/1999 |
| DE | 197 41 187 A1 | 3/1999 |
| DE | 198 05 122 A1 | 4/1999 |
| DE | 198 28 183 A1 | 12/1999 |
| DE | 198 39 199 A1 | 3/2000 |
| DE | 198 40 586 A1 | 3/2000 |
| DE | 198 47 115 C1 | 5/2000 |
| EP | 0 405 084 A2 | 1/1991 |
| EP | 0 422 532 A2 | 4/1991 |
| EP | 0 537 411 A1 | 4/1993 |
| EP | 0 770 639 A2 | 5/1997 |
| EP | 0 771 328 A1 | 5/1997 |
| EP | 0 812 872 A2 | 12/1997 |
| GB | 1 505 558 | 3/1978 |
| JP | 54-43285 A | 4/1979 |
| WO | WO 2008/150647 A1 | 12/2008 |
| WO | WO 2013/045259 A1 | 4/2013 |

OTHER PUBLICATIONS

International Preliminary Report on Patentability dated Jul. 26, 2016 in PCT/EP2015/050387.
U.S. Appl. No. 14/764,294, filed Jul. 29, 2015, US 2015-0368409 A1, Joachim Pakusch, et al.

* cited by examiner ured form and of the polymer powders obtainable from them
BINDER COMPOSITION

CROSS REFERENCE TO RELATED APPLICATION

This application is a 371 of PCT/EP2015/050387, filed on Jan. 12, 2015, and claims priority to European Patent Application No. 14152143.5, filed on Jan. 22, 2014.

The present invention relates to a binder composition comprising as essential components
a) at least one dispersion polymer P having a glass transition temperature ≤20° C., and comprising ethyl acrylate in copolymerized form, and
b) at least one mineral binder M in an amount such that it is ≥1 and ≤10 000 parts by weight per 100 parts by weight of dispersion polymer P.

The present invention further relates to a method for coating a substrate with the aforesaid binder composition, and also to the coated substrate itself.

Mineral binders M for the purposes of the present invention are inorganic binders in powder form which after having been contacted with water and when left to themselves in the air under atmospheric conditions or else in some cases under water undergo stonelike solidification as a function of time. Mineral binders M of this kind, such as burnt lime, gypsum, slag sand, flyash, silica dust, metakaolin, natural pozzolans or burnt oil shales, and also, in particular, cements (in this regard see, for example, EN 197-1), such as Portland cements, white cements, Thurament, Celitement, high-alumina cements, swelling cements, blast furnace cements, and also cements admixed with, for example, slag sand, flyash, silica dust, metakaolin, natural pozzolans, or burnt oil shales, are familiar to the skilled person.

The mineral binders M, which in general are also admixed with sands, gravels, or crushed rocks as aggregates, and also with other customary fillers or additives, are converted by contacting and mixing with water into their ready-to-use form, referred to for example as mortars or concretes (hereinafter "hydraulic binder formulations"), which are then processed in the usual way.

In order to improve the mechanical properties of the hydraulic binder formulations for processing, or of the solidified or set materials obtained from them (examples being flexural tensile strength, substrate adhesion, flexibility, etc.), the hydraulic binder formulations are admixed with finely divided polymers (number-average particle diameter ≥10 and ≤1000 nm) in the form of aqueous polymer dispersions or of the polymer powders obtainable from them (dispersion polymers) (see, for example, DE-AS 1669903, DE-A 2837898, DE-A 4206429, DE-A 4317035, DE-A 4317036, DE-A 4320220, U.S. Pat. Nos. ,3043,790, 3,196, 122, DE-A 3220384, U.S. Pat. Nos. 3,239,479, 3,232,899, 4,225,496, 4,340,510, BE-A 8454499, GB-PS 1505558, JP-A 54/43285, JP-A 91/131533, EP-A 537411, EP-A 770639, or EP-A 812872).

While the requirements in terms of the mechanical properties of the hydraulic binder formulations to be processed, and of the solidified or set materials obtained from them, are in general fully met, it is not always the case that the requirements with regard to emissions of volatile organic compounds (VOCs for short) are fully satisfied, especially when using dispersion polymers based on alkyl acrylates and/or alkyl methacrylates, by the solidified or set materials obtained. A classification for such solidified and set materials was introduced in 1997 by the Association for the Control of Emissions in Products for Floor Installation, Adhesives and Building Materials (GEV), with the quality mark EC1 for "very low VOCs" being awarded under the GEV EMICODE® to those solidified or set materials which after 3 days exhibit a total VOC of ≤1000 μg/m³ and after 28 days a total VOC of ≤100 μg/m³. To date there has been no disclosure of any mineral waterproofing formulations (known as mineral waterproofing grouts) based on mineral binders, more particularly cement, and on dispersion polymers comprising alkyl acrylates and/or alkyl methacrylates, whose set waterproofing coatings meet the low VOC emission levels required for the EC1 quality classification.

It was an object of the present invention, therefore, to provide a binder composition based on a mineral binder, more particularly cement, and on a dispersion polymer comprising alkyl acrylates and/or alkyl methacrylates, whose material set or solidified by reaction with water exhibits extremely low VOC emission, more particularly in accordance with GEV EMICODE®.

This object has been achieved by the binder composition defined at the outset.

An essential constituent of the binder composition is a dispersion polymer P having a glass transition temperature ≤20° C. and comprising ethyl acrylate in copolymerized form.

Dispersion polymers P for the purposes of the present specification are finely divided polymers having a number-average particle diameter ≥10 and ≤1000 nm in the form of aqueous polymer dispersions or of the polymer powders obtainable from the aqueous polymer dispersions.

With particular advantage the dispersion polymer P used for the binder composition of the invention comprises in copolymerized form
≥35 and ≤65 wt % of ethyl acrylate (monomer A),
≥0 and ≤5 wt % of at least one monoethylenically unsaturated compound having at least one silicon-containing group, one epoxy, N-methylol, or carbonyl group (monomers B),
≥0 and ≤7 wt % of at least one monoethylenically unsaturated compound having at least one hydroxyalkyl group (monomers C),
≥0 and ≤5 wt % of at least one monoethylenically unsaturated $C_3$ to $C_6$ monocarboxylic and/or $C_4$-$C_6$ dicarboxylic acid including the salts and anhydrides thereof (monomers D),
≥0 and ≤5 wt % of at least one compound having at least two nonconjugated ethylenically unsaturated groups (monomers E),
≥15 and ≤45 wt % of at least one ethylenically unsaturated compound different from but copolymerizable with the monomers A to E, for which a homopolymer synthesized solely from this ethylenically unsaturated compound in copolymerized form would have a glass transition temperature in the range ≤30° C. (monomers F), and
≥10 and ≤30 wt % of at least one ethylenically unsaturated compound different from but copolymerizable with the monomers A to E, for which a homopolymer synthesized solely from this ethylenically unsaturated compound in copolymerized form would have a glass transition temperature in the range ≥50° C. (monomers G),
and the amounts of the monomers A to G adding up to 100 wt %.

Ethyl acrylate exclusively is used as monomer A.

The dispersion polymer P of the invention comprises advantageously ≥35 and ≤65 wt %, especially advantageously ≥40 and ≤55 wt %, and with particular advantage ≥40 and ≤50 wt % of ethyl acrylate in copolymerized form.

Contemplated as monomers B are all monoethylenically unsaturated compounds having at least one silicon-containing group, one epoxy, N-methylol, or carbonyl group.

Contemplated as monomers B are all monoethylenically unsaturated compounds which have at least one silicon-containing group. With particular advantage, the monomers B containing silicon groups have a hydrolysable silicon-containing group. Hydrolysable silicon-containing groups advantageously include at least one alkoxy group or one halogen atom, such as chlorine, for example. Monomers B that can be used advantageously in accordance with the invention are disclosed in WO 2008/150647, page 9, lines 5 to 25. By virtue of their express referencing, these silicon group-containing monomers B are considered part of the present description. With particular advantage, however, the monomer B containing silicon groups is selected from the group encompassing vinyltriacetoxysilane, 3-methacryloyloxypropyltrimethylsilane, and vinyltriethoxysilane.

Further contemplated as monomers B are all monoethylenically unsaturated compounds which have at least one epoxy group, such as glycidyl acrylate and/or glycidyl methacrylate, for example, with glycidyl methacrylate being particularly preferred.

Further contemplated as monomers B are all monoethylenically unsaturated compounds which have at least one N-methylol group, such as N-methylolamide compounds based on $\alpha,\beta$-monoethylenically unsaturated $C_3$ to $C_6$ monocarboxylic or dicarboxylic amides, such as N-methylolacrylamide and/or N-methylolmethacrylamide more particularly.

Also contemplated as monomers B are all monoethylenically unsaturated compounds which have at least one carbonyl group, such as vinylcarbonyl compounds, such as phenyl vinyl ketone, for example, or dicarbonyl compounds, such as diacetoneacrylamide and also acetylacetoxyethyl acrylate and acetylacetoxyethyl methacrylate more particularly.

Employed with particular advantage as monomers B are vinyltriacetoxysilane, 3-methacryloyloxypropyltrimethylsilane, vinyltriethoxysilane, glycidyl acrylate, glycidyl methacrylate, N-methylolacrylamide, N-methylolmethacrylamide, phenyl vinyl ketone, diacetoneacrylamide, acetylacetoxyethyl acrylate and/or acetylacetoxyethyl methacrylate, with glycidyl methacrylate being especially preferred.

The dispersion polymer P of the invention comprises advantageously $\geq 0$ and $\leq 5$ wt %, especially advantageously $\geq 0.5$ and $\leq 4$ wt %, and with particular advantage $\geq 1$ and $\leq 3$ wt % of monomers B in copolymerized form.

Contemplated as monomers C are all monoethylenically unsaturated compounds having at least one hydroxyalkyl group.

Contemplated as monomers C are advantageously hydroxy-$C_2$-$C_{10}$-alkyl, preferably hydroxy-$C_2$-$C_4$-alkyl, and particularly advantageously hydroxy-$C_2$-$C_3$-alkyl acrylates and/or methacrylates, and for the purposes of this specification the alkoxylated hydroxyalkyl acrylates and/or methacrylates as well, i.e., those reacted with alkylene oxides (essentially ethylene oxide and propylene oxide), are to be considered monomers C. With advantage the hydroxyalkyl group-containing monomer C is selected from the group encompassing diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate, and 2-hydroxyethyl methacrylate. Especially preferred are 2-hydroxyethyl acrylate and/or 2-hydroxyethyl methacrylate, with 2-hydroxyethyl methacrylate being particularly preferred.

The dispersion polymer P of the invention comprises advantageously $\geq 0$ and $\leq 7$ wt %, especially advantageously $\geq 1$ and $\leq 6$ wt %, and with particular advantage $\geq 2$ and $\leq 5$ wt % of monomers C in copolymerized form.

Contemplated as monomers D are all monoethylenically unsaturated $C_3$ to $C_6$ monocarboxylic and/or $C_4$-$C_6$ dicarboxylic acids.

Contemplated as monomers D are advantageously acrylic acid, methacrylic acid, ethylacrylic acid, itaconic acid, allylacetic acid, crotonic acid, vinylacetic acid, fumaric acid, maleic acid, or 2-methylmaleic acid. The monomers D, however, also include the anhydrides of corresponding $\alpha,\beta$-monoethylenically unsaturated dicarboxylic acids, such as maleic anhydride or 2-methylmaleic anhydride. The monomers D are preferably selected from the group encompassing acrylic acid, methacrylic acid, crotonic acid, fumaric acid, maleic acid, maleic anhydride, 2-methylmaleic acid, and itaconic acid, with acrylic acid and/or methacrylic acid being particularly preferred. The monomers D of course also encompass the fully or partly neutralized water-soluble salts, more particularly the alkali metal salts, of the aforementioned acids.

The dispersion polymer P of the invention comprises advantageously $\geq 0$ and $\leq 5$ wt %, especially advantageously $\geq 0.1$ and $\leq 3$ wt %, and with particular advantage $\geq 0.1$ and $\leq 2$ wt % of monomers D in copolymerized form.

Contemplated as monomers E are all compounds which have at least two nonconjugated ethylenically unsaturated groups, such as vinyl, vinylidene, or alkenyl groups more particularly.

Particularly advantageous as monomers E are the diesters of dihydric alcohols with $\alpha,\beta$-monoethylenically unsaturated monocarboxylic acids, preferably acrylic and methacrylic acid. Examples of such monomers having two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, triesters of trihydric alcohols with $\alpha,\beta$-monoethylenically unsaturated monocarboxylic acids, such as glycerol triacrylate, glycerol trimethacrylate, trimethylolpropane triacrylate, trimethylolpropane trimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, or triallyl isocyanurate. Especially preferred are 1,4-butylene glycol diacrylate, allyl methacrylate and/or divinylbenzene, where divinylbenzene for the purposes of this specification is to be understood as meaning 1,2-divinylbenzene, 1,3-divinylbenzene and/or 1,4-divinylbenzene.

The dispersion polymer P of the invention comprises advantageously $\geq 0$ and $\leq 5$ wt %, especially advantageously $\geq 0$ and $\leq 3$ wt %, and with particular advantage $\geq 0$ and $\leq 2$ wt % of monomers E in copolymerized form. With especial advantage the dispersion polymer P comprises $\leq 1$ wt % or none at all of monomers E in copolymerized form.

Contemplated as monomers F are all ethylenically unsaturated compounds which are different from but copolymerizable with the monomers A to E, and for which a homopolymer synthesized solely from the respective monomer F in copolymerized form would have a glass transition temperature in the range ≤30° C.

Examples of monomers F are conjugated aliphatic $C_4$ to $C_9$ diene compounds, esters of vinyl alcohol and a $C_1$ to $C_{10}$ monocarboxylic acid, $C_1$ to $C_{10}$ alkyl acrylate, $C_5$ to $C_{10}$ alkyl methacrylate, $C_5$ to $C_{10}$ cycloalkyl acrylate and methacrylate, $C_1$ to $C_{10}$ dialkyl maleate and/or $C_1$ to $C_{10}$ dialkyl fumarate, vinyl ethers of $C_3$ to $C_{10}$ alkanols, and branched and unbranched $C_3$ to $C_{10}$ olefins. Advantageous monomers F are those whose homopolymers have a glass transition temperature Tg≤0° C. and especially advantageously ≤−10° C.

$C_1$ to $C_{10}$ alkyl groups in the context of this specification are linear or branched alkyl radicals having 1 to 10 carbon atoms, examples being methyl, ethyl, n-propyl, isopropyl, n-butyl, sec-butyl, isobutyl, tert-butyl, n-pentyl, isopentyl, tert-pentyl, n-hexyl, 2-ethylhexyl, n-nonyl, or n-decyl. $C_5$ to $C_{10}$ cycloalkyl groups are preferably cyclopentyl or cyclohexyl groups, which may optionally be substituted by 1, 2, or 3 $C_1$ to $C_4$ alkyl groups.

Especially suitable as monomers F are vinyl acetate, methyl acrylate, n-propyl acrylate, isopropyl acrylate, n-butyl acrylate, sec-butyl acrylate, isobutyl acrylate, n-hexyl acrylate, n-octyl methacrylate, 2-ethylhexyl acrylate, n-hexyl methacrylate, 2-ethylhexyl methacrylate, 2-propylheptyl acrylate, isodecyl acrylate, n-dodecyl acrylate, n-dodecyl methacrylate, benzyl acrylate, ethyldiglycol acrylate, di-n-butyl maleate and/or di-n-butyl fumarate, especially preferably methyl acrylate, isopropyl acrylate, n-butyl acrylate, sec-butyl acrylate, isobutyl acrylate, n-hexyl acrylate, n-hexyl methacrylate, n-octyl methacrylate, 2-ethylhexyl acrylate, 2-ethylhexyl methacrylate, 2-propylheptyl acrylate, isodecyl acrylate, n-dodecyl acrylate, n-dodecyl methacrylate, benzyl acrylate, and ethyldiglycol acrylate, but particularly advantageously 2-ethylhexyl acrylate.

The dispersion polymer P of the invention comprises advantageously ≥15 and ≤45 wt %, especially advantageously ≥20 and ≤35 wt %, and with particular advantage ≥25 and ≤30 wt % of monomers F in copolymerized form.

Contemplated as monomers G are all ethylenically unsaturated compounds which are different from but copolymerizable with the monomers A to E and for which a homopolymer synthesized solely from the respective monomer G in copolymerized form would have a glass transition temperature in the range ≥50° C. Advantageous monomers G are those whose homopolymers have a glass transition temperature Tg≥80° C. and especially advantageously ≥100° C.

Examples of monomers G are vinylaromatic monomers, $C_2$ to $C_4$ alkyl methacrylates and ethylenically unsaturated nitrile compounds. Vinylaromatic monomers are understood to include, in particular, derivatives of styrene or of α-methylstyrene in which the phenyl rings are optionally substituted by 1, 2, or 3 $C_1$ to $C_4$ alkyl groups, halogen, more particularly bromine or chlorine, and/or methoxy groups. The ethylenically unsaturated nitrile compounds are essentially the nitriles which derive from the aforementioned α,β-monoethylenically unsaturated, more particularly $C_3$ to $C_6$, preferably $C_3$ or $C_4$ monocarboxylic or dicarboxylic acids, such as, for example, acrylonitrile, methacrylonitrile, maleonitrile and/or fumaronitrile, with acrylonitrile and/or methacrylonitrile being particularly preferred. Particularly preferred such monomers are styrene, 2-methylstyrene, 3-methylstyrene, 4-methylstyrene, 2,4-dimethylstyrene, 2,5-dimethylstyrene, and 3,5-dimethylstyrene, p-acetoxystyrene, p-bromostyrene, p-tert-butylstyrene, o-, m-, or p-chlorostyrene, methyl methacrylate, ethyl methacrylate, isopropyl methacrylate, tert-butyl acrylate, tert-butyl methacrylate, isobutyl methacrylate, n-hexyl acrylate, cyclohexyl methacrylate, acrylonitrile, methacrylonitrile, but also tert-butyl vinyl ether or cyclohexyl vinyl ether, but especially preferably methyl methacrylate, ethyl methacrylate, isopropyl methacrylate, tert-butyl acrylate, tert-butyl methacrylate, phenyl methacrylate, cyclohexyl methacrylate, styrene, 3-methylstyrene, 4-methylstyrene, 2,4-dimethylstyrene, 2,5-dimethylstyrene, and 3,5-dimethylstyrene.

Styrene finds use with particular advantage.

The dispersion polymer P of the invention comprises advantageously ≥10 and ≤30 wt %, especially advantageously ≥15 and ≤30 wt %, and with particular advantage ≥15 and ≤25 wt % of monomers F in copolymerized form.

The dispersion polymer P used in accordance with the invention comprises, in one preferred embodiment, in copolymerized form ≥40 and ≤55 wt % of monomer A,
≥0.5 and ≤4 wt % of monomers B,
≥1 and ≤6 wt % of monomers C,
≥0.1 and ≤3 wt % of monomers D,
≥0 and ≤3 wt % of monomers E,
≥20 and ≤35 wt % of monomers F, and
≥15 and ≤30 wt % of monomers G,
and, in one particularly preferred form,
≥40 and ≤50 wt % of monomer A,
≥1 and ≤3 wt % of monomers B,
≥2 and ≤5 wt % of monomers C,
≥0.1 and ≤2 wt % of monomers D,
≥0 and ≤2 wt % of monomers E,
≥25 and ≤30 wt % of monomers F, and
≥15 and ≤25 wt % of monomers G.

In one advantageous embodiment the dispersion polymer P comprises in copolymerized form ≥40 and ≤50 wt % of ethyl acrylate,
≥1 and ≤3 wt % of vinyltriacetoxysilane, 3-methacryloyloxypropyltrimethylsilane, vinyltriethoxysilane, glycidyl acrylate, glycidyl methacrylate, N-methylolacrylamide, N-methylolmethacrylamide, phenyl vinyl ketone, diacetoneacrylamide, acetylacetoxyethyl acrylate and/or acetylacetoxyethyl methacrylate,
≥2 and ≤5 wt % of diethylene glycol monoacrylate, 4-hydroxybutyl acrylate, 3-hydroxypropyl acrylate, 2-hydroxypropyl acrylate, 2-hydroxyethyl acrylate, diethylene glycol monomethacrylate, 4-hydroxybutyl methacrylate, 3-hydroxypropyl methacrylate, 2-hydroxypropyl methacrylate and/or 2-hydroxyethyl methacrylate,
≥0.1 and ≤2 wt % of acrylic acid, methacrylic acid, crotonic acid, fumaric acid, maleic acid, maleic anhydride, 2-methylmaleic acid and/or itaconic acid,
≥0 and ≤2 wt % of 1,4-butylene glycol diacrylate, allyl methacrylate and/or divinylbenzene,
≥25 and ≤30 wt % of methyl acrylate, isopropyl acrylate, n-butyl acrylate, sec-butyl acrylate, isobutyl acrylate, n-hexyl acrylate, n-hexyl methacrylate, n-octyl methacrylate, 2-ethylhexyl acrylate, 2-ethylhexyl methacrylate, 2-propylheptyl acrylate, isodecyl acrylate, n-dodecyl acrylate, n-dodecyl methacrylate, benzyl acrylate and ethyldiglycol acrylate, and
≥15 and ≤25 wt % of methyl methacrylate, ethyl methacrylate, isopropyl methacrylate, tert-butyl acrylate, tert-butyl methacrylate, phenyl methacrylate, cyclohexyl methacrylate, styrene, 3-methylstyrene, 4-methylstyrene, 2,4-dimethylstyrene, 2,5-dimethylstyrene, and 3,5-dimethylstyrene.

In one particularly advantageous embodiment the dispersion polymer P comprises in copolymerized form
≥40 and ≤50 wt % of ethyl acrylate,
≥1 and ≤3 wt % of glycidyl methacrylate,
≥2 and ≤5 wt % of 2-hydroxyethyl methacrylate,
≥0.1 and ≤2 wt % of acrylic acid,
≥25 and ≤30 wt % of 2-ethylhexyl acrylate, and
≥15 and ≤25 wt % of styrene.

It is essential, however, that the dispersion polymer P has a glass transition temperature Tg in the range of ≤20° C. and advantageously ≤5° C.

In accordance with the invention the dispersion polymers P are used in a binder composition together with a mineral binder M. If, therefore, the dispersion polymer P is to be used in flexible mineral waterproofing grouts, the dispersion polymers P are advantageously selected such that their glass transition temperature Tg is in the range of ≥−40 and ≤5° C, advantageously in the range ≥−20 and ≤5° C, and especially advantageously in the range ≥−15 and ≤0° C. If, in contrast, the dispersion polymer P is to be used in mineral repair mortars, the dispersion polymers P are advantageously selected such that their glass transition temperature Tg is in the range of ≥−10 and ≤20° C, advantageously in the range ≥0 and ≤20° C, and especially advantageously in the range ≥5 and ≤15° C. If, however, the dispersion polymer P is to be used in mineral plasters, then the dispersion polymers P are advantageously selected such that their glass transition temperature Tg is in the range of ≥−10 and ≤20° C, advantageously in the range ≥−5 and ≤10° C, and especially advantageously in the range ≥−5 and ≤5° C. The dispersion polymers P used in accordance with the invention therefore comprise the monomers A to G in copolymerized form in a nature and amount such that the polymers have the aforementioned glass transition temperatures Tg.

According to Fox (T. G. Fox, Bull. Am. Phys. Soc. 1956 [Ser. II] 1, page 123 and in accordance with Ullmann's Encyclopädie der technischen Chemie, vol. 19, page 18, 4th edition, Verlag Chemie, Weinheim, 1980) the glass transition temperature of copolymers with no more than low levels of crosslinking is given in good approximation by:

$$1/Tg = x_1/Tg_1 + x_2/Tg_2 + \ldots x_n/Tg_n,$$

where $x_1, x_2, \ldots x_n$ are the mass fractions of the monomers $1, 2, \ldots n$ and $Tg_1, Tg_2, \ldots Tg_n$ are the glass transition temperatures of the polymers formed in each case only from one of the monomers $1, 2, \ldots n$, in degrees Kelvin. The glass transition temperatures of these homopolymers of the majority of ethylenically unsaturated monomers are known (or can be determined experimentally in a simple manner known per se) and are listed for example in J. Brandrup, E. H. Immergut, Polymer Handbook 1st ed., J. Wiley, New York, 1966, 2nd ed., J. Wiley, New York, 1975, and 3rd ed., J. Wiley, New York, 1989, and also in Ullmann's Encyclopedia of Industrial Chemistry, page 169, Verlag Chemie, Weinheim, 1992.

In the context of this specification, the figures for glass transition temperatures, Tg, relate, however, to the glass transition temperatures determined by the DSC method (Differential Scanning calorimetry, 20 K/min, midpoint measurement, DIN 53765) by means of a DSC 822 instrument (series TA 8000) from Mettler-Toledo.

The preparation of the dispersion polymers P is familiar in principle to the skilled person and is accomplished, for example, by radical polymerization of the monomers A to G by the method of bulk, emulsion, solution, precipitation or suspension polymerization, but with more particular preference being given to radically initiated aqueous emulsion polymerization.

The implementation of radically initiated emulsion polymerizations of ethylenically unsaturated monomers in an aqueous medium has been described many times before and is therefore sufficiently well known to the skilled person [in this regard cf. Emulsion Polymerization in Encyclopedia of Polymer Science and Engineering, vol. 8, pages 659 ff. (1987); D. C. Blackley, in High Polymer Latices, vol. 1, pages 35 ff. (1966); H. Warson, The Applications of Synthetic Resin Emulsions, chapter 5, pages 246 ff. (1972); D. Diederich, Chemie in unserer Zeit 24, pages 135 to 142 (1990); Emulsion Polymerization, Interscience Publishers, New York (1965); DE-A 40 03 422; and Dispersionen synthetischer Hochpolymerer, F. Hölscher, Springer-Verlag, Berlin (1969)]. The radically initiated aqueous emulsion polymerization customarily takes place such that the ethylenically unsaturated monomers are dispersed in the aqueous medium, generally with additional use of dispersing assistants, such as emulsifiers and/or protective colloids, and are polymerized by means of at least one water-soluble radical polymerization initiator. In the resultant aqueous polymer dispersions, the residual levels of unreacted ethylenically unsaturated monomers are particularly advantageously lowered by chemical and/or physical methods likewise known to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115], the polymer solids content is adjusted to a desired level by dilution or concentration, or other customary adjuvants, such as, for example, bactericides, foam-modifying or viscosity-modifying additives, are added to the aqueous polymer dispersion. The preparation of an aqueous dispersion of the dispersion polymer P differs from this general procedure only in the specific use of the aforementioned monomers A to G. It is self-evident here that with regard to the preparation of the dispersion polymer P in the context of the present specification, the intention is also that the seed, staged, and gradient regimes familiar to the skilled person are also encompassed.

In the context of the present specification, therefore, the amounts of monomers A to G used for preparing the dispersion polymers P are intended to correspond to the amounts of monomers A to G present in copolymerized form in the dispersion polymer P.

For preparing the dispersion polymers P, of or used in accordance with the invention, in the form of their aqueous polymer dispersions (dispersion polymer P dispersions) it is possible for the total amount of the monomers A to G (total monomer amount) to be introduced as initial charge to the aqueous reaction medium before the polymerization reaction is initiated. It is also possible, however, to introduce optionally only a portion of the monomers A to G as initial charge to the aqueous reaction medium before the polymerization reaction is initiated, and then, following initiation of the polymerization, under polymerization conditions, during the radical emulsion polymerization, to add the total amount or the optionally remaining amount, in accordance with the rate of consumption, continuously, with consistent or varying volume flow rates, or discontinuously. In that case the metering of the monomers A to G may take place in the form of separate, individual streams, as inhomogeneous or homogeneous (sub-)mixtures or as a monomer emulsion. The monomers A to G are metered advantageously in the form of a monomer mixture, more particularly in the form of an aqueous monomer emulsion.

For preparing the dispersion polymer P dispersions of the invention, the assistants used include dispersing assistants, which hold the monomer droplets and the resultant polymer particles in disperse distribution in the aqueous medium and hence ensure the stability of the aqueous polymer dispersions produced. Dispersing assistants contemplated include not only the protective colloids commonly used for implementing radical aqueous emulsion polymerizations but also emulsifiers.

Examples of suitable protective colloids are polyvinyl alcohols, polyalkylene glycols, alkali metal salts of polyacrylic acids and polymethacrylic acids, gelatin derivatives, or acrylic acid, methacrylic acid, maleic anhydride, 2-acrylamido-2-methylpropanesulfonic acid and/or 4-styrenesulfonic acid copolymers and their alkali metal salts, and also homopolymers and copolymers of N-vinylpyrrolidone, N-vinylcaprolactam, N-vinyl-carbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. A detailed description of further suitable protective colloids is found in Houben-Weyl, Methoden der organischen Chemie, vol. XIV/1, Makromolekulare Stoffe [Macromolecular compounds], Georg-Thieme-Verlag, Stuttgart, 1961, pages 411 to 420.

It will be appreciated that mixtures of protective colloids and/or emulsifiers can also be used. Use is frequently made as dispersants exclusively of emulsifiers, whose relative molecular weights, unlike those of the protective colloids, are usually below 1000. They may be anionic, cationic or nonionic in nature. It will be appreciated that, where mixtures of surface-active substances are used, the individual components must be compatible with one another, something which in case of doubt can be ascertained by means of a few preliminary tests. Generally speaking, anionic emulsifiers are compatible with one another and with nonionic emulsifiers. The same is true of cationic emulsifiers, whereas anionic and cationic emulsifiers are normally not compatible with one another. An overview of suitable emulsifiers is found in Houben-Weyl, Methoden der organischen Chemie, vol. XIV/1, Makromolekulare Stoffe [Macromolecular compounds], Georg-Thieme-Verlag, Stuttgart, 1961, pages 192 to 208.

However, particularly emulsifiers are used as dispersing assistants.

Examples of customary nonionic emulsifiers include ethoxylated mono-, di-, and tri-alkylphenols (EO degree: 3 to 50, alkyl radical: $C_4$ to $C_{12}$) and also ethoxylated fatty alcohols (EO degree: 3 to 80; alkyl radical: $C_8$ to $C_{36}$). Examples thereof are the Lutensol® A grades ($C_{12}C_{14}$ fatty alcohol ethoxylates, EO degree: 3 to 8), Lutensol® AO grades ($C_{13}C_{15}$ oxo-process alcohol ethoxylates, EO degree: 3 to 30), Lutensol® AT grades ($C_{16}C_{18}$ fatty alcohol ethoxylates, EO degree: 11 to 80), Lutensol® ON grades ($C_{10}$ oxo-process alcohol ethoxylates, EO degree: 3 to 11), and Lutensol® TO grades ($C_{13}$ oxo-process alcohol ethoxylates, EO degree: 3 to 20), all from BASF SE.

Examples of customary anionic emulsifiers include alkali metal salts and ammonium salts of alkyl sulfates (alkyl radical: $C_8$ to $C_{12}$), of sulfuric monoesters with ethoxylated alkanols (EO degree: 4 to 30, alkyl radical: $C_{12}$ to $C_{18}$) and with ethoxylated alkylphenols (EO degree: 3 to 50, alkyl radical: $C_4$ to $C_{12}$), of alkylsulfonic acids (alkyl radical: $C_{12}$ to $C_{18}$), and of alkylarylsulfonic acids (alkyl radical: $C_9$ to $C_{18}$).

Of proven suitability as further anionic emulsifiers are, furthermore, compounds of the general formula (I)

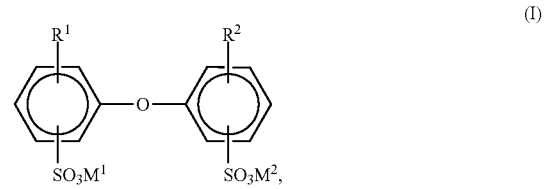

in which $R^1$ and $R^2$ are H atoms or $C_4$ to $C_{24}$ alkyl and are not simultaneously H atoms, and $M^1$ and $M^2$ can be alkali metal ions and/or ammonium ions. $R^1$ and $R^2$ in the general formula (I) are preferably linear or branched alkyl radicals with 6 to 18 carbon atoms, in particular with 6, 12, and 16 carbon atoms, or hydrogen, $R^1$ and $R^2$ not both simultaneously being H atoms. $M^1$ and $M^2$ are preferably sodium, potassium or ammonium, with sodium being particularly preferred. Particularly advantageous compounds (I) are those in which $M^1$ and $M^2$ are sodium, $R^1$ is a branched alkyl radical with 12 carbon atoms, and $R^2$ is an H atom or $R^1$. Frequently use is made of technical mixtures which contain a fraction of 50% to 90% by weight of the monoalkylated product, such as Dowfax® 2A1 (brand name of the Dow Chemical Company). The compounds (I) are common knowledge, from U.S. Pat. No. 4,269,749 for example, and are available commercially.

Suitable cation-active emulsifiers are in general $C_6$ to $C_{18}$ alkyl-, $C_6$ to $C_{18}$ alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts, and also salts of amine oxides, quinolinium salts, isoquinolinium salts, tropylium salts, sulfonium salts, and phosphonium salts. Mention may be made by way of example of dodecylammonium acetate or the corresponding sulfate, the sulfates or acetates of the various 2-(N,N,N-trimethylammonium)ethyl paraffin esters, N-cetylpyridinium sulfate, N-laurylpyridinium sulfate, and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate, and also the gemini surfactant N,N'-(lauryldimethyl)ethylenediamine disulfate, ethoxylated tallowalkyl-N-methylammonium sulfate, and ethoxylated oleylamine (for example, Uniperol® AC from BASF SE, approximately 11 ethylene oxide units). Numerous further examples are found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. Minimal nucleophilicity in the anionic counter-groups is favorable, appropriate examples being perchlorate, sulfate, phosphate, nitrate, and carboxylates, such as acetate, trifluoroacetate, trichloroacetate, propionate, oxalate, citrate, and benzoate, and also conjugated anions of organic sulfonic acids, such as methylsulfonate, trifluoromethylsulfonate, and para-toluenesulfonate, for example, and additionally tetrafluoroborate, tetraphenylborate, tetrakis-(pentafluorophenyl)borate, tetrakis[bis(3,5-trifluoromethyl)phenyl]borate, hexafluoro-phosphate, hexafluoroarsenate or hexafluoroantimonate.

The emulsifiers used with preference as dispersing assistants are employed advantageously in a total amount of ≥0.005% and ≤10% by weight, preferably ≥0.01% and ≤5% by weight, in particular ≥0.1% and ≤3% by weight, based in each case on the total amount of monomer.

The total amount of protective colloids used in addition to or in place of the emulsifiers as dispersing assistants is often ≥0.1% and ≤40% and frequently ≥0.2% and ≤25% by weight, based in each case on the total amount of monomer.

It is preferred, however, to use anionic and/or nonionic emulsifiers as dispersing assistants.

For preparing the dispersion polymer P dispersions of the invention, the total amount of the dispersing assistant can be introduced as initial charge to the aqueous reaction medium before the polymerization reaction is initiated. It is also possible, however, optionally to introduce only a portion of the dispersing assistant as initial charge to the aqueous reaction medium before the polymerization reaction is initiated, and then to add the total amount or the optionally remaining amount of the dispersing assistant continuously or discontinuously, under polymerization conditions, during the radical emulsion polymerization. The major amount or the total amount of dispersing assistant is preferably added in the form of an aqueous monomer emulsion.

The radically initiated aqueous emulsion polymerization is set off by means of a radical polymerization initiator (free-radical initiator). Such initiators may in principle be peroxides and also azo compounds. It will be appreciated that redox initiator systems are also contemplated. Peroxides used can in principle be inorganic peroxides, such as hydrogen peroxide or peroxodisulfates, such as the mono- or di-alkali metal or -ammonium salts of peroxodisulfuric acid, examples being their mono- and di-sodium, -potassium or -ammonium salts, or organic peroxides, such as alkyl hydroperoxides, examples being tert-butyl, p-methyl or cumyl hydroperoxide, and also dialkyl or diaryl peroxides, such as di-tert-butyl or dicumyl peroxide. Azo compounds that find use are substantially 2,2'-azobis(isobutyronitrile), 2,2'-azobis(2,4-dimethylvaleronitrile), and 2,2'-azobis(amidinopropyl) dihydrochloride (AIBA, corresponding to V–50 from Wako Chemicals). Suitable oxidants for redox initiator systems are substantially the above-mentioned peroxides. As corresponding reductants it is possible to employ compounds of sulfur in a low oxidation state, such as alkali metal sulfites, examples being potassium and/or sodium sulfite, alkali metal hydrogen sulfites, examples being potassium and/or sodium hydrogen sulfite, alkali metal metabisulfites, examples being potassium and/or sodium metabisulfite, formaldehyde-sulfoxylates, examples being potassium and/or sodium formaldehyde sulfoxylate, alkali metal salts, especially potassium and/or sodium salts, of aliphatic sulfinic acids, and alkali metal hydrogen sulfides, such as potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone. In general the amount of free-radical initiator used, based on the total monomer amount, is 0.01% to 5%, preferably 0.1% to 3%, and more preferably 0.2% to 1.5% by weight.

For preparing the dispersion polymer P dispersions of the invention, the total amount of the free-radical initiator can be introduced as initial charge to the aqueous reaction medium before the polymerization reaction is initiated. It is also possible, however, to introduce, optionally, only a portion of the free-radical initiator as initial charge to the aqueous reaction medium before the polymerization reaction is initiated, and then to add the total amount or the optionally remaining amount continuously or discontinuously, at the rate of consumption, under polymerization conditions, during the radical emulsion polymerization.

The initiation of the polymerization reaction means the start of the polymerization reaction of the monomers present in the polymerization vessel, after the free-radical initiator has formed radicals. This initiation of the polymerization reaction may take place by addition of free-radical initiator to the aqueous polymerization mixture in the polymerization vessel under polymerization conditions. It is, however, also possible for a portion or the total amount of the free-radical initiator to be added to the aqueous polymerization mixture, comprising the monomers initially introduced, in the polymerization vessel under conditions not suitable for setting off a polymerization reaction, such as low temperature, for example, and to subsequently bring about polymerization conditions in the aqueous polymerization mixture. By polymerization conditions here are meant, generally, those temperatures and pressures under which the radically initiated aqueous emulsion polymerization proceeds at a sufficient polymerization rate. They are dependent in particular on the free-radical initiator used. The nature and amount of the free-radical initiator, the polymerization temperature, and the polymerization pressure are advantageously selected such that the free-radical initiator has a half-life <3 hours, with particular advantage <1 hour, and with very particular advantage <30 minutes, while continually providing initiating radicals to a sufficient extent to initiate and maintain the polymerization reaction.

Reaction temperature contemplated for the radical aqueous emulsion polymerization encompasses the whole range from 0 to 170° C. It is usual to employ temperatures of 50 to 120° C., preferably 60 to 110° C., and more preferably 70 to 100° C. The radical aqueous emulsion polymerization can be carried out at a pressure less than, equal to or greater than 1 atm [1.013 bar (absolute), atmospheric pressure], so that the polymerization temperature may exceed 100° C. and may be up to 170° C. In the presence of monomers A to F with a low boiling point, the emulsion polymerization is conducted preferably under increased pressure. This pressure may adopt values of 1.2, 1.5, 2, 5, 10 or 15 bar (absolute) or even higher. Where the emulsion polymerization is carried out at subatmospheric pressure, pressures of 950 mbar, frequently of 900 mbar and often 850 mbar (absolute), are brought about. The radical aqueous emulsion polymerization is carried out advantageously at 1 atm in the absence of oxygen, more particularly under an inert gas atmosphere, such as under nitrogen or argon, for example.

The aqueous reaction medium may in principle also comprise minor amounts (<5% by weight) of water-soluble organic solvents, such as methanol, ethanol, isopropanol, butanols, pentanols, or alternatively acetone, etc. Preferably, the aqueous reaction medium contains no such solvents.

Besides the aforementioned components, radical chain transfer compounds can also be used, optionally, during the emulsion polymerization, in order to control or reduce the molecular weight of the polymers P available through the polymerization. Use in this case is made substantially of aliphatic and/or araliphatic halogen compounds, examples being n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2- butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecane-thiol and its isomers, substituted thiols, such as 2-hydroxyethanethiol, aromatic thiols, such as benzenethiol, ortho-, meta-, or para-methylbenzenethiol, and all further sulfur compounds described in Polymer Handbook 3rd edition, 1989, J. Brandrup and E. H. Immergut, John Wiley & Sons, section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane or vinylcyclohexane, or hydrocarbons with readily abstractable hydrogen atoms, such as toluene, for example. Another possibility, though, is to use mixtures of mutually nondisrupting aforementioned radical chain transfer compounds.

The total amount of radical chain transfer compounds used optionally during the emulsion polymerization, based on the total amount of monomer, is generally ≤5%, often ≤3%, and frequently ≤1%, by weight.

It is advantageous if a portion or the entirety of the optionally employed radical chain transfer compound is supplied to the aqueous reaction medium prior to the initiation of the radical polymerization. Furthermore, a portion or the entirety of the radical chain transfer compound may also be supplied to the aqueous reaction medium advantageously together with the monomers A to G during the polymerization.

With particular advantage the preparation of the dispersion polymer P dispersions takes place such that the monomers A to G are reacted under polymerization conditions through to a conversion of ≥95% by weight, advantageously ≥99% by weight, and with particular advantage ≥99.5% by weight. Determining the monomer conversion is familiar to the skilled person and is accomplished more particularly by reaction-calorimetric and/or spectroscopic methods. Frequently it is advantageous if the dispersion polymer P dispersions obtained after the end of the polymerization are subjected to an aftertreatment for the purpose of reducing the residual monomer content. This aftertreatment takes place either chemically, as for example by completion of the polymerization reaction through the use of a more effective free-radical initiator system (referred to as postpolymerization), and/or physically, as for example by stripping of the dispersion polymer P dispersions with steam or inert gas. Corresponding chemical and/or physical methods are familiar to the skilled person [see, for example, EP-A 771328, DE-A 19624299, DE-A 19621027, DE-A 19741184, DE-A 19741187, DE-A 19805122, DE-A 19828183, DE-A 19839199, DE-A 19840586, and 19847115]. The combination of chemical and physical aftertreatment there offers the advantage that not only the unreacted monomers but also other disruptive volatile organic constituents (the so-called VOCs [volatile organic compounds]) are removed from the dispersion polymer P dispersions.

The dispersion polymer P dispersions of the invention typically have a polymer solids content of ≥10% and ≤70% by weight, frequently ≥20% and ≤65% by weight, and often ≥25% and ≤60% by weight, based in each case on the aqueous polymer dispersion. The number-average particle diameter (cumulant z-average) determined via quasielastic light scattering (ISO standard 13 321) is situated generally in the range ≥10 and ≤1000 nm, preferably in the range ≥50 and ≤600 nm, and advantageously in the range ≥100 to ≤500 nm.

The dispersion polymer P dispersions advantageously have a pH in the range from ≥4.5 to ≤8 and with more particular advantage from ≥5.5 to ≤7.5, measured in each case with a calibrated, commercially customary pH meter at 23° C.

It will be appreciated that from the dispersion polymer P dispersions of the invention, it is possible to prepare the corresponding dispersion polymer P powder compositions by customary drying methods (such as freeze drying or spray drying, for example).

The dispersion polymer P powder compositions can be prepared with particular advantage by spray drying methods that are familiar to the skilled person, from the dispersion polymer P dispersions. For this purpose, in general, the dispersion polymer P dispersions are admixed with 0.1% to 30%, frequently 5% to 15%, by weight, based on the total amount of dispersion polymer P, of what are called drying assistants. Such drying assistants are familiar to the skilled person and are disclosed for example in EP-A 812872, page 5, line 20 to page 6, line 17, and also in the prior art indicated therein.

Depending on the intended use of the binder compositions of the invention, drying assistants with a liquefying or solidifying action may be used for preparing the dispersion polymer P powder compositions. If, therefore, the binder compositions of the invention are to be used for producing mineral waterproofing grouts, it is advantageous to select drying assistants with a liquefying action, such as polymers or oligomers, in particular, which have sulfonic acid groups, sulfonate groups, carboxyl groups, or carboxylate groups, of the kind disclosed in EP-A 812872, page 5, lines 20 to 38, for example, for producing the corresponding dispersion polymer P powder compositions. If, in contrast, the binder compositions of the invention are to be used for producing mineral repair mortars or for producing mineral plasters, then it is advantageous to select drying assistants with a solidifying action, such as, in particular, homopolymers or copolymers of vinyl alcohol, homopolymers or copolymers of vinylpyrrolidone, or cellulose derivatives, of the kind disclosed in EP-A 812872, page 5, lines 38 to 44, for example, for producing the corresponding dispersion polymer P powder compositions.

The spray drying of the additized dispersion polymer P dispersions of the invention takes place here generally such that the additized dispersion polymer P dispersions are sprayed in a drying tower with an entry temperature $T_{en}$ of the hot air stream at 100 to 200° C., preferably at 120 to 160° C., and with an exit temperature $T_{ex}$ of the hot air stream of 30 to 90° C., preferably 50 to 90° C. Spraying of the additized dispersion polymer P dispersions in the hot air stream may take place here by means, for example, of single-fluid or multi-fluid nozzles or via a rotating disk. The dispersion polymer P powder compositions are normally deposited using cyclones or filter separators. The sprayed additized dispersion polymer P dispersion and the hot air stream are preferably conveyed in parallel. It is advantageous, during the spray drying operation in the drying tower, to meter in, additionally, a finely divided mineral antiblocking agent familiar to the skilled person, such as finely divided silica gel, for example, which has the effect in particular of preventing caking of the polymer powder composition particles obtained by spray drying during prolonged storage.

Also encompassed in accordance with the invention, accordingly, are the dispersion polymer P powder compositions which are formed in a drying operation and comprise particles of the dispersion polymer P incorporated into a matrix of spraying assistant. The primary particle diameter of the particles of the dispersion polymer P that are embedded in the matrix of the spraying assistant corresponds to the number-average particle diameter of the dispersion polymer P in the dispersion polymer P dispersion, and is generally in the range ≥10 and ≤1000 nm, preferably in the range ≥50 and ≤600 nm, and advantageously in the range ≥100 to ≤500 nm.

The binder compositions of the invention comprise as essential components the dispersion polymer P and a mineral binder M in an amount such that it is ≥1 and ≤10 000 parts by weight per 100 parts by weight of dispersion polymer P.

Mineral binders M contemplated are all inorganic binders in powder form which after having been contacted with water and when left to themselves in the air under atmospheric conditions or else in some cases under water undergo stonelike solidification as a function of time, such as, in particular, burnt lime, gypsum, slag sand, flyash, silica dust, metakaolin, natural pozzolans or burnt oil shales, and also, in particular, cements (in this regard see, for example, EN 197-1), such as Portland cements, white cements, Thurament, Celitement, high-alumina cements, swelling cements, blast furnace cements, and also cements admixed with, for example, slag sand, flyash, silica dust, metakaolin, natural pozzolans, or burnt oil shales.

If the binder composition of the invention is to be used for producing a mineral waterproofing grout, then ≥1 and ≤10 000 parts by weight, advantageously ≥5 and ≤500 parts by weight, and especially advantageously ≥10 and ≤150 parts by weight of mineral binder M are used per 100 parts by weight of dispersion polymer P. If, in contrast, the binder composition of the invention is to be used for producing a mineral tile adhesive, then ≥1 and ≤100 000 parts by weight, advantageously ≥50 and ≤10 000 parts by weight, and especially advantageously ≥100 and ≤2000 parts by weight of mineral binder M are used per 100 parts by weight of dispersion polymer P. In contrast, when using the binder composition of the invention for producing a mineral repair mortar or a flooring compound, ≥1 and ≤100 000 parts by weight, advantageously ≥100 and ≤50 000 parts by weight, and especially advantageously ≥300 and ≤10 000 parts by weight of mineral binder M are used per 100 parts by weight of dispersion polymer P. Similarly, when using the binder composition of the invention for producing a mineral plaster (thermal insulation composite system), 1 and ≤100 000 parts by weight, advantageously ≥50 and ≤10 000 parts by weight, and especially advantageously ≥100 and ≤5000 parts by weight of mineral binder M are used per 100 parts by weight of dispersion polymer P. Cement is used with particular advantage as mineral binder M.

In one advantageous embodiment, the intention according to the invention is to include mineral waterproofing grout formulations whose mineral binder M consists of a mixture of Portland cement (DIN EN 197-1, CEM I to CEM V, preferably CEM I) with a high-alumina cement (DIN EN 14647). With particular advantage, the weight ratio of Portland cement to high-alumina cement is in the range ≥0.01 and ≤3, more particularly in the range ≥0.1 and ≤1, and preferably ≥0.2 and ≤0.8. Particularly suitable as Portland cement are Milke® from HeidelbergCement, Holcim Normo® 5R from Holcim, or Der Rote® from Lafarge, while particularly suitable high-alumina cement is Istra® 40 from Calucem, Ciment Fondu® or Ternal® from Kerneos, or Electroland® from Ciments Molins.

In accordance with the invention the intention is to include binder compositions both in powder form and in aqueous form. The binder compositions in powder form are dry mixes of the aforementioned dispersion polymer P powder compositions with the powder-form mineral binders M, further comprising—depending on intended application—customary powder aggregates, such as sands or fillers, and also additives, such as defoamers, thickeners, retention agents, retardants and/or accelerators, for example, in a customary quantity familiar to the skilled person. These binder compositions in powder form have the advantage that in the dry state they can be stored indefinitely and easily transported to their site of use, where, after blending with water and also, optionally, further adjuvants, such as sands, gravels, and crushed rocks, in particular, and also with further customary additives, they are converted into the ready-to-use hydraulic binder formulations.

The binder compositions of the invention may of course also comprise water, giving aqueous binder compositions. In that case the aqueous binder compositions are obtained by for example admixing a dispersion polymer P dispersion to the mineral binder M in powder form, or to mixtures of solids comprising mineral binders M in powder form, these mixtures comprising, for example, fillers, such as sands, gravels, and crushed rocks, in particular, and also further customary fillers or additives, and blending these components to form the ready-to-use hydraulic binder formulation. Furthermore, aqueous binder compositions can also be obtained by blending the aforementioned binder compositions in powder form (comprising at least one mineral binder M and also at least one dispersion polymer P powder composition) with water, optionally with addition of fillers, such as sands, gravels, and crushed rocks in particular, and with further customary fillers or additives, to form the ready-to-use hydraulic binder formulation.

The weight ratio of water to mineral binder M in accordance with the invention, depending on the area of application, is in the range ≥0.1 and ≤10; in the case of mineral waterproofing grouts, the weight ratio of water to mineral binder M is in the range ≥0.4 and ≤1.5 and preferably in the range ≥0.6 and ≤1. In the case of mineral tile adhesives, flooring compounds, repair mortars, and plasters, in contrast, the water/mineral binder M weight ratio is in the range ≥0.2 and ≤1.5 and preferably in the range ≥0.4 and ≤1.

In one preferred embodiment the intention is to include mineral waterproofing grout formulations whose dispersion polymer P is synthesized in copolymerized form from ≥40 and ≤50 wt % of ethyl acrylate,
≥1 and ≤3 wt % of glycidyl methacrylate,
≥2 and ≤5 wt % of 2-hydroxyethyl methacrylate,
≥0.1 and ≤2 wt % of acrylic acid,
≥25 and ≤30 wt % of 2-ethylhexyl acrylate, and
≥15 and ≤25 wt % of styrene, where ≥10 and ≤150 parts by weight of mineral binder M are used per 100 parts by weight of dispersion polymer P, the mineral binder M being a mixture of Portland cement and high-alumina cement in a weight ratio of Portland cement to high-alumina cement in the range ≥0.01 and ≤3, more particularly in the range ≥0.1 and ≤1, and preferably ≥0.2 and ≤0.8. In another preferred embodiment the intention is to include aforementioned waterproofing grout formulations where their weight ratio of water to mineral binder M is in the range ≥0.6 and ≤1.

The aqueous binder compositions of the invention, especially the ready-to-use hydraulic binders, are suitable advantageously for the coating of substrates. The intention accordingly in accordance with the invention is also to encompass a method for coating a substrate that comprises applying an aqueous binder composition of the invention, more particularly the ready-to-use hydraulic binder, to the surface of a substrate and then curing it. In this case the amount of aqueous binder composition is selected such that the aqueous binder composition applied to the substrate results in a dry film thickness (i.e., film thickness after curing of the mineral binder M)≥0.1 and ≤20 mm. Where the aqueous binder composition is a mineral waterproofing grout formulation, the application rate is selected so as to result in a dry film thickness ≥0.5 and ≤5 mm and with particular advantage ≥1 and ≤3 mm.

Substrates contemplated include in principle all organic and inorganic materials. With particular advantage, though, in accordance with the invention, substrates can be used which have a highly absorptive or "hungry" surface, by which the skilled person means porous inorganic materials having a capillary effect for water, such as, more particularly, set concrete, screed, plaster, or plasterboard.

In a corresponding way, the intention is also that the substrates coated with a binder composition should be included in accordance with the invention.

The binder compositions of the invention are suitable advantageously for producing coatings, more particularly mineral sealing systems, which after they have cured exhibit a low propensity toward emission of volatile organic constituents and as a result comply in particular with the strict EC1 limits.

The nonlimiting examples which follow are intended to elucidate the invention.

EXAMPLES

1 Preparation of the Polymer Dispersions
1.1 Preparation of Inventive Polymer Dispersion P1
In a polymerization reactor
398.4 g of an aqueous polystyrene seed dispersion having a solids content of 0.53 wt % and a weight-average particle diameter of 30 nm (d50, determined using an analytical ultracentrifuge) were heated to 75° C. with stirring under a nitrogen atmosphere. Then a solution consisting of 0.4 g of ascorbic acid and 3.9 g of deionized water was added. Added after 5 minutes, beginning simultaneously and with maintenance of the internal temperature at 75° C., were
a) an aqueous monomer emulsion consisting of
420.0 g of 2-ethylhexyl acrylate,
273.0 g of styrene,
630.0 g of ethyl acrylate,
28.0 g of glycidyl methacrylate,
42.0 g of 2-hydroxyethyl methacrylate,
7.0 g of acrylic acid,
140.0 g of a 20 wt % strength aqueous solution of an alkyl polyethoxylate based on a saturated $C_{16}$-18 fatty alcohol (ethyleneoxy [EO] degree 18) [emulsifier solution 1],
61.3 g of a 32 wt % strength aqueous solution of an Na salt of a $C_{16}$-18 fatty alcohol polyglycol ether sulfate (ethylene oxide [EO] degree 18) [emulsifier solution 2], and
378.0 g of deionized water,
b) 28 g of a 10 wt % strength aqueous hydrogen peroxide solution, and
c) a solution consisting of 3.8 g of ascorbic acid and 34 g of deionized water,
the additions taking place continuously over 3 hours at constant flow rates. Thereafter the reaction mixture was stirred for half an hour and then cooled to 70° C. Added at this temperature, beginning simultaneously and with maintenance of the internal temperature at 70° C., over the course of 2 hours, were 21 g of a 10 wt % strength aqueous hydrogen peroxide solution and a solution of 6.3 g of ascorbic acid in 56.7 g of deionized water, the additions taking place continuously and at constant flow rates. Thereafter the reaction mixture was cooled to 20 to 25° C. (room temperature) and adjusted to a pH of 7.5 with a 10 wt % strength aqueous sodium hydroxide solution. This gave a polymer dispersion having a solids content of 54.9 wt %, a light transmittance of 49.7%, and a glass transition temperature Tg of −11° C.

The solids contents were determined generally by drying an aliquot (about 2 g) of the aqueous polymer dispersion to constant weight at 140° C. Two separate measurements were carried out in each case. The figure reported in each of the examples represents the average of the two results.

The light transmittance values (LD) were determined generally after dilution of the aqueous polymer dispersion to 0.01 wt % at 20° C. using a DR/2010 spectrophotometer from Hach. The layer thickness was 2.5 cm.

The glass transition temperatures of the polymer were determined generally with a DSC method (Differential Scanning calorimetry, 20 K/min, midpoint measurement, DIN 53765).

1.2 Preparation of Comparative Dispersion PC1
Comparative dispersion PC1 was prepared as for polymer dispersion P1. The composition was merely changed from 420 g to 210 g in relation to the monomer 2-ethylhexyl acrylate, from 273 g to 133 g in respect of the monomer styrene, and from 630 g to 980 g in respect of the monomer ethyl acrylate.

This gave a polymer dispersion having a solids content of 54.6 wt %, a light transmittance of 50.9%, and a glass transition temperature of −11° C.

1.3 Preparation of Comparative Dispersion PC2
Comparative dispersion PC2 was prepared as for polymer dispersion P1. The composition was merely changed from 420 g to 560 g in relation to the monomer 2-ethylhexyl acrylate, from 273 g to 357 g in respect of the monomer styrene, and from 630 g to 406 g in respect of the monomer ethyl acrylate.

This gave a polymer dispersion having a solids content of 55.2 wt %, a light transmittance of 46.4%, and a glass transition temperature of −7° C.

1.4 Preparation of comparative PC3
In a polymerization reactor
307.6 g of a polystyrene seed dispersion having a solids content of 0.68 wt % and a weight-average particle diameter of 30 nm (d50, determined using an analytical ultracentrifuge) were heated to 90° C. with stirring under a nitrogen atmosphere. Then a solution consisting of 0.3 g of sodium peroxodisulfate and 4.2 g of deionized water was added in one portion. Added after 5 minutes, beginning simultaneously and with maintenance of the internal temperature at 90° C., were
a) an aqueous monomer emulsion $C_1$ consisting of
798.0 g of 2-ethylhexyl acrylate,
480.5 g of styrene,
28.0 g of glycidyl methacrylate,
90.0 g of 2-hydroxyethyl methacrylate,
35.0 g of a 20 wt % strength aqueous solution of an alkyl polyethoxylate based on a saturated $C_{16}$-18 fatty alcohol (ethyleneoxy [EO] degree 18) [emulsifier solution 1],
4.4 g of a 32 wt % strength aqueous solution of an Na salt of a $C_{16}$-18 fatty alcohol polyglycol ether sulfate (ethylene oxide [EO] degree 18) [emulsifier solution 2], 64.3 g of a 7 wt % strength aqueous solution of an Na salt of 2-ethylhexyl sulfosuccinate [emulsifier solution 3], and 508.9 g of deionized water over 3 hours, and b) a solution consisting of 6.8 g of sodium peroxodisulfate and 89.7 g of deionized water, continuously over 3 hours and 15 minutes, the additions taking place continuously at constant flow rates. After the end of feeding of the monomer emulsion C1, 30.0 g of n-butyl acrylate were added continuously over 15 minutes. Thereafter the reaction mixture was stirred for half an hour and then cooled to 85° C. Added at this temperature, beginning simultaneously and with maintenance of the internal temperature at 85° C., over the course of 2 hours, were a solution consisting of 3 g of tert-butyl hydroperoxide and 27 g of deionized water, and a solution consisting of 4.5 g of acetone bisulfite and 29.8 g of deionized water, the additions taking place continuously and at constant flow rates. Thereafter the reaction mixture was cooled to room temperature and adjusted to a pH of 7.5 with 10 wt % strength aqueous sodium hydroxide solution.

This gave a polymer dispersion having a solids content of 56.2 wt %, a light transmittance of 40.3%, and a glass transition temperature of −11° C.

The resulting aqueous polymer dispersions were subsequently adjusted to a solids content of 50 wt %, using deionized water.

2 Performance Investigations 2.1 Preparation of the wet component for the mineral binder formulation 32 g of the 50% polymer dispersions P1, and also PC1 to PC3, were each admixed with 0.2 g of Degressal® SD 21 (defoamer, BASF SE) and homogenized in a tumble mixer for 1 minute.

2.2 Preparation of the Inventive Dry Component T for the Mineral Binder Formulation The constituents of the inventive dry component T, such as Portland cement, high-alumina cement, calcium sulfate hemihydrate, silica sand, lithium carbonate, and citric acid, were weighed out into a beaker, as specified in table 1, and homogenized in a tumble mixer for 1 minute.

TABLE 1

Composition of the inventive dry component T of the mineral binder formulations

| Ingredients | wt % |
|---|---|
| Portland cement (Milke ® CEM I 52.5 R) | 8.0 |
| High-alumina cement (Istra ® 40) | 12.0 |
| Calcium sulfate hemihydrate (Schönox) | 0.4 |
| Lithium carbonate powder (BCK Bau-Chemie-Kontor) | 0.1 |
| Citric acid powder (BCK Bau-Chemie-Kontor) | 0.25 |
| Silica sand F36 (Quarzwerke Frechen) | 79.25 |

2.3 Preparation of the Comparative Dry Component V for the Mineral Binder Formulation The constituents of the comparative dry component V, such as Portland cement, calcium carbonate, and silica sand, were weighed out into a beaker, as specified in table 2, and homogenized in a tumble mixer for 1 minute.

TABLE 2

Composition of the comparative dry component V of the mineral binder formulations

| Ingredients | wt % |
|---|---|
| Portland cement (Milke ® CEM I 52.5 R) | 20.0 |
| Calcium carbonate (OmyaCarb ® GU 15) | 10.0 |
| Silica sand (0.08-0.2 mm) | 50.0 |
| Silica sand (0.1-0.4 mm) | 20.0 |

2.4 Preparative Mixing of the Mineral Binder Formulation and Production of the Corresponding Films Both the water/cement ratio and the polymer/cement ratio were kept constant at 0.8 for the inventive binder formulations DS1 and the comparative formulations DSC1 to DSC4 (the individual components are reported in table 3). For this purpose, in a mixer specified in accordance with DIN EN 196-1 (2005-05), 100 g of the dry component T or V were incorporated with stirring at 300 rpm over the course of 30 seconds into 32.2 g of the wet component. Stirring was then continued at 600 rpm for 2 minutes in order to ensure that the respective mineral binder formulation was homogeneously mixed and free from lumps. After a rest time of 3 minutes, the respective mineral binder formulation was applied using a filling knife, with the assistance of a stainless steel frame (length 25 cm, width 15 cm), to a plate covered with Teflon film (length 27 cm, width 17 cm). Drawing a filling knife over the stainless steel frame ensured in each case that the plate was covered with a uniform layer of 2.6 mm. During the preparative mixing of the mineral binder formulations, during storage, and during testing, the temperature was a constant 23° C. and the relative humidity was a constant 50% (standard conditions).

TABLE 3

Composition of the mineral binder formulations

| Polymer dispersion | Dry component | Mineral binder formulation |
|---|---|---|
| P1 | T | DS1 |
| PC1 | T | DSC1 |
| PC2 | T | DSC2 |
| PC3 | T | DSC3 |
| P1 | V | DSC4 |

2.5. Production and Storage of Test Specimens

After 24 hours, the respective dried binder formulations were removed from the plate, and 6 dumbbell-shaped test specimens were punched out in each case, with the following dimensions: 7.5 cm total length; 1.3 cm total width; 0.4 cm center width; 3 cm center length. Care was taken to ensure that each of the test specimens had no defects. The respective test specimens were stored and tested in line with the requirements of AS/NZS 4858:2004 (wet area membranes). A set of 3 of the test specimens was stored under standard conditions for a further 13 days on a grid rack and then tested ("dry storage"). The other set of 3 test specimens was stored for a further 6 days under standard conditions on a grid rack, then stored for 21 days in 0.5 molar aqueous KOH solution at 40° C. and subsequently dried off.

The dumbbell test specimens obtained were tested mechanically on a ProLine Z010 universal testing machine from Zwick, Ulm (Germany). The test specimens were accommodated in clamping jaws. They were placed between the jaws in such a way that the center section was clearly visible. Testing was carried out with a speed of 50 mm/minute. Determinations were made of the force and elongation at which the test specimen fractured. With incorporation of the thickness of the test specimen, it was possible in this way to ascertain the fracture force and also the elongation at break. The values reported in tables 4 and 5 represent the average values of the results obtained. Table 4 reports the results after dry storage, and table 5 the results after storage in the aqueous KOH solution.

TABLE 4

Breaking force and elongation at break of the binder formulations DS1 and DSC1 to DSC3 after 14 days of dry storage.

| Mineral binder | Breaking force [N/mm$^2$] | Elongation at break [%] |
| --- | --- | --- |
| DS1 | 0.7 | 47 |
| DSC1 | 0.7 | 44 |
| DSC2 | 0.6 | 35 |
| DSC3 | 0.8 | 51 |
| DSC4 | 0.8 | 43 |

TABLE 5

Breaking force and elongation at break of the binder formulations DS1 and DSC1 to DSC3 after storage in KOH solution

| Mineral binder | Breaking force [N/mm$^2$] | Elongation at break [%] |
| --- | --- | --- |
| DS1 | 0.4 | 16 |
| DSC1 | fracture of test specimens | |
| DSC2 | 0.2 | 19 |
| DSC3 | 0.2 | 13 |
| DSC4 | 0.5 | 16 |

From the results of dry storage it is clearly apparent that the mechanical properties of the films formed from the inventive binder formulation DS1 are comparable with the films of the comparative formulations DSC2, DSC3, and DSC4. Increasing the ethyl acrylate fraction in the dispersion polymer to outside the claimed range, as in the case of PC1, results in complete failure of the films of DSC1 after storage in KOH solution.

3 Determination of Volatile Organic Constituents
3.1 Preparation of the Aqueous Binder Formulation 480 g of the 50% polymer dispersions P1, and also PC1 to PC3, were each admixed with 3 g of Degressal® SD 21 and homogenized in a tumble mixer for 1 minute.

3.2 Preparation of the Inventive Dry Component T for the Mineral Binder Formulations The constituents of the inventive dry component T, such as Portland cement, high-alumina cement, calcium sulfate hemihydrate, silica sand, lithium carbonate, and citric acid, were weighed out into a beaker, as specified in table 1, and homogenized in a tumble mixer for 1 minute.

3.3 Preparation of the Comparative Dry Component V for the Aqueous Binder Formulation The constituents of the comparative dry component V, such as Portland cement, calcium carbonate, and silica sand, were weighed out into a beaker, as specified in table 2, and homogenized in a tumble mixer for 1 minute.

3.4 Preparative Mixing of the Mineral Binder Formulations and Coating of the Substrates Both the water/cement ratio and the polymer/cement ratio were kept constant at 0.8 for the inventive binder formulation DS1 and the comparative formulations DSC1 to DSC4. For this purpose, in a mixer specified in accordance with DIN EN 196-1 (2005-05), 1500 g of the dry component were incorporated with stirring at 300 rpm over the course of 30 seconds into 483 g of the wet component. Stirring was then continued at 600 rpm for 2 minutes in order to ensure that the aqueous binder formulations were homogeneously mixed and free from lumps. After a rest time of 3 minutes, the respective mineral binder formulations were applied using a filling knife, with the assistance of a stainless steel frame (length 34 cm, width 14 cm), to a grease-free glass plate (length 35 cm, width 15 cm). Drawing a filling knife over the stainless steel frame ensured in each case that the plate was covered with a uniform layer of 3 mm. The preparative mixing of the mineral binder formulations and the coating operation each took place under standard conditions.

3.5 Emissions Testing

The coating of the glass plates and also the determination of the volatile constituents of the aqueous binder composition were carried out in accordance with the GEV test method—"Determination of volatile organic compounds for characterizing emission-controlled floor installation materials, adhesives, construction products and parquet varnishes" in the version of Apr. 15, 2013 from Eurofins Product Testing A/S of Denmark.

After the glass plate had been coated with the specific mineral binder formulation, it was immediately transferred to the test chamber, where it remained until the end of air sampling. The stainless steel test chamber was operated, unless otherwise specified, in accordance with the requirements of DIN EN ISO 16000-9 (interior air impurities—part 9: determination of the emission of volatile organic compounds from construction products and fittings—emission chamber method; 2008-04). The temperature in the chamber, and also the incoming air, were regulated to 23±1° C. and an atmospheric humidity of 50±5%. The rate of air replacement was regulated at 0.5 h$^{-1}$ with a loading of 0.4 m$^2$/m$^3$. The chamber volume was 119 liters.

Air sampling for the first test for VOCs took place 3 days (72±1 hour) after application of the coating. Sampling and the determination of the VOCs were carried out in accordance with DIN EN ISO 16000-6 (interior air impurities—part 6: determination of VOC in interior air and in test chambers, sampling on TENAX TA® adsorption columns, thermal desorption and gas chromatography with MS/FID; 2008-04). Individual substances at a concentration above 1 µg/m$^3$ were thereby detected and quantified.

For this purpose, the columns, packed with TENAX TA® 60/80, were flushed with a stream of helium. This was followed by sampling, by passing a volume flow of 80 ml per minute from the test chamber through the TENAX adsorption columns for a period of 120 minutes. Subnormal findings as a result of overloading were prevented by the serial connection of two tubes. The VOCs were determined after thermal desorption in a stream of helium, using a gas chromatograph coupled with a mass spectrometer from Perkin-Elmer. An apolar column from Agilent was used, with the following characteristics: column length 30 m; internal diameter 0.25 mm; film thickness 0.25 µm (HP-1). A duplicate determination was run.

The long-term emissions were detected 28 days (672±4 hours) after application of the coating, as described above.

All individual substances which are on the list of LCI values (lowest concentrations of (toxicological) interest) were identified in this way, quantified individually, and calculated in the form of a toluene equivalent. The sum total of all the volatile organic compounds detected (TVOC), as listed in table 6, was determined by adding up the amounts for all of the individual substances listed.

TABLE 6

Amount of the emissions from the mineral binder formulations
DS1 and also DSC1 to DSC4 after 3 and 28 days

| Mineral binder | TVOC [in μg/m³] | |
|---|---|---|
| | after 3 days | after 28 days |
| DS1 | 180 | 75 |
| DSC1 | 15 | 10 |
| DSC2 | 320 | 190 |
| DSC3 | 1100 | 760 |
| DSC4 | 610 | 240 |

An EC1 quality mark in the GEV EMICODE® system is obtainable when the emissions of the films after 3 days show a TVOC of ≤1000 μg/m³ and of ≤100 μg/m³ after 28 days. As can be seen from table 6, the required TVOC values for the EC1 quality mark cannot be achieved with the comparative formulations. This is possible only with the inventive binder formulation DS1 and the comparative formulation DSC1, with the latter failing to meet the requirements in terms of mechanical properties, as shown in table 5.

The invention claimed is:

1. A binder composition, comprising:
   a) at least one dispersion polymer P having a glass transition temperature ≤20° C; and
   b) at least one mineral binder M in an amount such that it is ≥1 and ≤10 000 parts by weight per 100 parts by weight of dispersion polymer P,
   wherein:
   the dispersion polymer P comprises, in copolymerized form:
   ≥35 and ≤65 wt % of a monomer A consisting of ethyl acrylate;
   >0 and ≤5 wt % of at least one monomer B comprising a monoethylenically unsaturated compound comprising at least one silicon-containing group, at least one epoxy group, or at least one carbonyl group;
   >0 and ≤7 wt % of at least one monomer C comprising a monoethylenically unsaturated compound comprising at least one hydroxyalkyl group;
   >0 and ≤5 wt % of at least one monomer D comprising at least one of a monoethylenically unsaturated $C_3$ to $C_6$ monocarboxylic, a $C_4$-$C_6$ dicarboxylic acid, and a salt or anhydride thereof;
   ≥0 and ≤5 wt % of at least one monomer E comprising a compound having at least two nonconjugated ethylenically unsaturated groups;
   ≥15 and ≤45 wt % of at least one monomer F comprising an ethylenically unsaturated compound different from, but copolymerizable with, the monomers A to E, for which a homopolymer synthesized solely from this ethylenically unsaturated compound in copolymerized form would have a glass transition temperature of ≤30° C.; and
   ≥10 and ≤30 wt % of a monomer G comprising at least one ethylenically unsaturated compound different from, but copolymerizable with, the monomers A to E, for which a homopolymer synthesized solely from this ethylenically unsaturated compound in copolymerized form would have a glass transition temperature of ≥50° C. (monomers G),
   the amounts of the monomers A to G adding up to 100 wt %; and
   when a coating of the binder composition is formed on a grease-free glass plate, said coating having a thickness of 3 mm and being 34 cm in length and 14 cm in width, and the coating is tested in a stainless steel test chamber in accordance with the requirements of DIN EN ISO 16000-9 with sampling and determination of volatile organic compounds (VOCs) being carried out in accordance with DIN EN ISO 16000-9. emissions of the volatile organic compounds (VOCs) from the coating satisfy the following requirements:
   a total amount of all volatile organic compounds (TVOC) after 3 days of storage is less than 1,000 μg/m³; and
   a total amount of all volatile organic compounds (TVOC) after 28 days of storage is less than 100 μg/m³.

2. The binder composition according to claim 1, wherein the dispersion polymer P comprises, in copolymerized form:
   ≥35 and ≤65 wt % of the monomer A consisting of the ethyl acrylate;
   >0 and ≤5 wt % of the at least one monomer B comprising the monoethylenically unsaturated compound comprising at least one silicon-containing group, at least one epoxy group, or at least one carbonyl group;
   >0 and ≤7 wt % of the at least one monomer C comprising the monoethylenically unsaturated compound comprising at least one hydroxyalkyl group;
   >0 and ≤5 wt % of the at least one monomer D comprising at least one of the monoethylenically unsaturated $C_3$ to $C_6$ monocarboxylic, a $C_4$-$C_6$ dicarboxylic acid, and a salt or anhydride thereof;
   >0 and ≤5 wt % of the at least one monomer E comprising the compound having at least two nonconjugated ethylenically unsaturated groups;
   ≥15 and ≤45 wt % of the at least one monomer F comprising the ethylenically unsaturated compound different from, but copolymerizable with, the monomers A to E, for which a homopolymer synthesized solely from this ethylenically unsaturated compound in copolymerized form would have a glass transition temperature of ≤30° C.; and
   ≥10 and ≤30 wt % of the monomer G comprising the at least one ethylenically unsaturated compound different from, but copolymerizable with, the monomers A to E, for which a homopolymer synthesized solely from this ethylenically unsaturated compound in copolymerized form would have a glass transition temperature of ≥50° C.,
   the amounts of the monomers A to G adding up to 100 wt %.

3. The binder composition according to claim 1, wherein the dispersion polymer P has a glass transition temperature ≤5° C.

4. The binder composition according to claim 1, wherein the monomer F is at least one monomer selected from the group consisting of methyl acrylate, isopropyl acrylate, n-butyl acrylate, sec-butyl acrylate, isobutyl acrylate, n-hexyl acrylate, n-hexyl methacrylate, n-octyl methacrylate, 2-ethylhexyl acrylate, 2-ethylhexyl methacrylate, 2-propylheptyl acrylate, isodecyl acrylate, n-dodecyl acrylate, n-dodecyl methacrylate, benzyl acrylate, and ethyldiglycol acrylate.

5. The binder composition according to claim 1, wherein the monomer G is at least one monomer selected from the group consisting of methyl methacrylate, ethyl methacrylate, isopropyl methacrylate, tert-butyl acrylate, tert-butyl methacrylate, phenyl methacrylate, cyclohexyl methacrylate, styrene, 3-methylstyrene, 4-methylstyrene, 2,4-dimethylstyrene, 2,5-dimethylstyrene, and 3,5-dimethylstyrene.

6. The binder composition according to claim 1, wherein dispersion polymer P has a number-average particle diameter ≥100 and ≤500 nm.

7. The binder composition according to claim 1, wherein dispersion polymer P comprises, in copolymerized form:
- ≥40 and ≤50 wt % of the ethyl acrylate,
- ≥1 and ≤3 wt % of glycidyl methacrylate,
- ≥2 and ≤5 wt % of 2-hydroxyethyl methacrylate,
- ≥0.1 and ≤2 wt % of acrylic acid,
- ≥25 and ≤30 wt % of 2-ethylhexyl acrylate, and
- ≥15 and ≤25 wt % of styrene.

8. The binder composition according to claim 1, wherein mineral binder M comprises a cement.

9. The binder composition according to claim 1, wherein mineral binder M comprises a mixture of a Portland cement and a high-alumina cement.

10. The binder composition according to claim 1, further comprising water.

11. The binder composition according to claim 10, wherein a weight ratio of the water to the mineral binder M is ≥0.1 and ≤10.

12. A method for coating a substrate, the method comprising:
applying the binder composition according to claim 10 to a surface of a substrate, and then
curing the applied binder composition to obtain a coating on the substrate.

13. A coated substrate obtained by the method according to claim 12.

14. The method according to claim 12, wherein the binder composition is applied with a dry film thickness ≥0.1 and ≤20 mm to the surface of the substrate.

15. The method according to claim 12, wherein the substrate is concrete, screed, plaster, or plasterboard.

16. A method of making a waterproofing grout, the method comprising:
mixing the binder composition according to claim 10 into a mineral grout to obtain a mineral waterproofing grout.

17. A dispersion polymer P, comprising, in copolymerized form:
- ≥40 and ≤50 wt % of ethyl acrylate,
- ≥1 and ≤3 wt % of glycidyl methacrylate,
- ≥2 and ≤5 wt % of 2-hydroxyethyl methacrylate,
- ≥0.1 and ≤2 wt % of acrylic acid,
- ≥25 and ≤30 wt % of 2-ethylhexyl acrylate, and
- ≥15 and ≤25 wt % of styrene.

18. A method of making a waterproofing grout, the method comprising:
mixing the dispersion polymer P according to claim 17 into a mineral grout to obtain a mineral waterproofing grout.

* * * * *

UNITED STATES PATENT AND TRADEMARK OFFICE
CERTIFICATE OF CORRECTION

PATENT NO. : 10,384,976 B2
APPLICATION NO. : 15/113324
DATED : August 20, 2019
INVENTOR(S) : Joerg Nieberle et al.

It is certified that error appears in the above-identified patent and that said Letters Patent is hereby corrected as shown below:

In the Specification

Column 7, Line 61, "calorimetry," should read -- Calorimetry, --

Column 18, Line 24, "calorimetry," should read -- Calorimetry, --

In the Claims

Column 24, Line 40, Claim 2, "mononer" should read -- monomer --

Column 24, Line 55, Claim 4, "isohutyl" should read -- isobutyl --

Signed and Sealed this
Fourteenth Day of April, 2020

Andrei Iancu
*Director of the United States Patent and Trademark Office*